March 22, 1938.  M. CHALLIER  2,111,887
ROTARY CUTTING TOOL
Original Filed July 16, 1935

Inventor,
Mario Challier,
By Sommers & Young attys.

Patented Mar. 22, 1938

2,111,887

UNITED STATES PATENT OFFICE 2,111,887

ROTARY CUTTING TOOL

Mario Challier, Turin, Italy

Application July 16, 1935, Serial No. 31,701.
Renewed January 18, 1938. In Italy December 24, 1934

7 Claims. (Cl. 29—103)

This invention relates to the manufacture of hobs, milling cutters, circular saws, reamers, screw-cutting taps, drills and the like with teeth of constant profile.

It is known that the essential conditions for a good backed off rotary cutting tool are that the profile of the teeth must remain constant during successive radial grindings and that the backing off angle at all points of the cutting profile must not fall below a predetermined limit, which in general may be considered to be 6°. Thus, the backing off angle of any particular point is the acute angle between the tangent and the perpendicular to the operating radius of that point in the plane of operation. Since perpendiculars to these lines also form the same angle, the acute angle between a radius from the operating center passing through the chosen point and the perpendicular to the tangent at said point is a measure of the backing off angle at said point.

By the term "backed off" is meant the deviation of a line formed by a point on the generating profile in the generation of the tooth with respect to an arc drawn through the initial position of said point from the operating center of the tool in the plane of operation of the tool. The "backing off angle" is the angle formed between the surface of the tooth and an arc having its center at the operating center of the tool and lying in the plane of operation.

The principal types of known rotary backed off cutting tools are those employing an Archimedean spiral or a logarithmic spiral, which possess the serious disadvantage that the backing off angle on the sides of the teeth is small, while a large backing off angle would give rise to vibrations and would cause the backs of the teeth to be damaged, consequently there is a considerable amount of friction on the said flanks, due to the tangential rubbing which exerts a considerable resistance to forward motion and rapid wear.

A rotary cutting tool having teeth backed off in such a manner as to obviate the above-mentioned disadvantages is described and claimed in my Patent No. 2,053,392, dated September 8, 1936.

According to the method of generation of the teeth disclosed in said patent, a tooth is generated by making the generating profile run along a simple or multiple straight directrix, while maintaining it constantly at the same time in a radial direction.

By the term "directrix" is meant a known or predetermined line along which or with respect to which a generator moves according to a given rule in the generation of a point line or surface to be determined.

In this way a backed off tooth is obtained, the profile of which remains strictly constant during successive radial grindings, and the angle of backing off, on account of the fact that it varies, is maintained sufficiently great on the back and on the flanks to eliminate friction and the consequent excessive wear.

In this method of generating the tooth, the individual points of the generating profile describe slightly curved lines, the concave side of which is turned towards the rectilinear directrix, these curved lines are arcs of conchoids of which the asymptote is the above said straight directrix line and the center of generation lies on the blank axis.

It has been found that if the position, the useful length, and inclination of the rectilinear directrix with respect to the plane of the generating profile are suitably chosen, the variation in the backing off angle may be contained within strict limits and the initial backing off angle may be chosen sufficiently great and with little variation, and such as to preserve for the backing off angle upon final grinding a good value, greater in all cases than 6°.

Thus, for example, if the directrix is straight and is at the base of the teeth, and if the initial backing off angle is made equal to 17°, the profile of the back of the teeth is an arc of a Nicomedean conchoid with the concave side turned towards the base of the tooth, the backing off angle of which over the useful working surface of the teeth varies from 17° (initial backing off angle) to 9° (final backing off angle, that is to say, after the last regrinding).

A rotary cutting tool of this character obviously is not constrained on the flanks, and after a long period of use can be renovated by slight grinding.

The present invention is based upon the discovery that satisfactory results and, in special cases, improved results are obtained if the directrix line asymptote employed is not a straight line and is not an Archimedean spiral or a logarithmic spiral. In this case the individual points of the generating profile during the generation of the tooth, describe conchoids which are naturally conchoids other than Nicomedean conchoids and are functions of the directrix line chosen.

The teeth obtained with these directrix lines have, like that obtained with the straight directrix, a sufficiently large and varying backing off angle on the back and on the flanks, so as to ensure a high efficiency of the tool.

The directrix lines may be of any type of the second or fourth order, simple or multiple, the useful length of which is chosen from the pitch of the tooth to be constructed and the inclination of which will give the chosen initial and final backing off angles.

Use may, for example, be made for particular templates of the tool of arcs of finite curvature of ellipses, hyperbolae, parabolae, spirals, cycloids, etc., and also all arcs of circles having a displaced centre of a finite radius greater than that of the cutter to be constructed.

It has in fact been observed that with such a simple directrix formed from such a displaced circular arc, it is possible to maintain the variation in the backing off angle for example from 17° to 11° in the useful portion of the tooth.

The reduced variation in backing off angle avoids the weakening of the back of the tooth and consequently reduces vibrations.

In fact an essential object of the present invention is not only to improve the efficiency of the tool having backed off teeth, but to overcome the objections of a constant backing off angle, which has always been erroneously coupled with the known necessity of having a constant profile.

It is laid down that the backing off angle is variable, but contained within strictly predetermined limits, according to the length and number of the teeth and also to the position, inclination and useful length of the chosen directrix.

In the known systems use was made of the so-called straight backing off, with teeth backed off with parallel lines, but to the detriment of the constant profile, and further with too great a variation in the backing off angle.

Such systems which were of little practical value were limited to rough work.

The present invention, therefore, employs directrices other than rectilinear directrices, and a generating profile is made to move with a constant relation to said simple or multiple directrices and to maintain its position in a constant radial direction with respect to the operating center of the tool.

In this way a strictly constant profile will be obtained, although the backing off angle varies. The backing off angle is, however, always a satisfactory angle and consequently the object of obviating friction with the consequent advantages is attained.

The essential feature in the choice of these numerous directrices is that of providing tools with backed off teeth the backing off angles of which always vary, but is always the best angle and, therefore, is contained between determined limits, in order to maintain the profile strictly constant, as contra-distinguished from the known curvilinear tools which have merely a constant backing off angle.

It is to be understood that according to the present invention the curved directrix or directrices employed are not straight lines; that is, the special case in which a straight line is sometimes considered an arc of a circle of infinite radius is not included within the meaning of the term "curved line" or the like in the present specification and claims.

The invention is illustrated by way of example in the accompanying drawing, in which.

Figure 1:
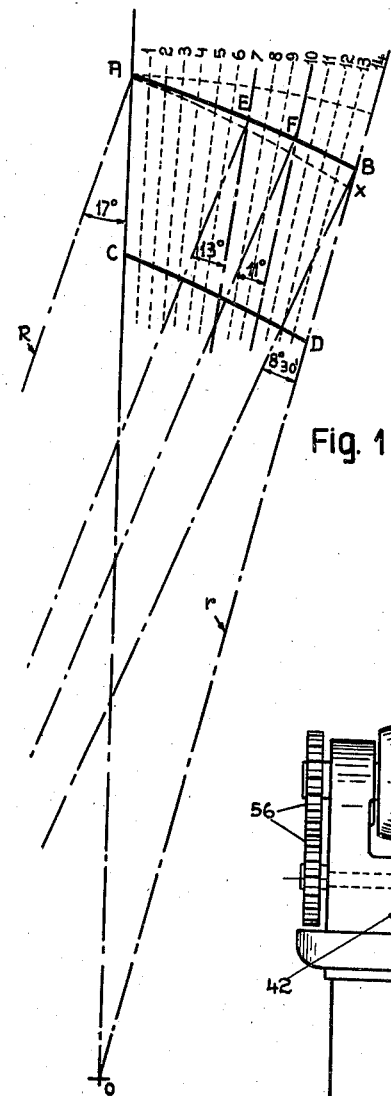
Figure 1 illustrates diagrammatically a cutter tooth, backed off with a directrix formed by a circular arc having a displaced centre and a finite radius greater than that of the cutter to be constructed.

Referring to Figure 1, AB is the directrix adjacent the back of the tooth, formed by a circular arc, the centre of which is displaced to the left with respect to the centre 0 of the cutter and the radius of which is finite.

The ratio between the radius $r$ of the whole tool and the radius $R$ of the directrix of the tooth is usually chosen as 1/2.5, but it can be of any other desired ratio.

If now the flank profile of the tooth is traced it will be found that all the points of the generating profile AC describe conchoids of the circular arc AB.

More particularly the conchoids CD, which is the intersection with the plane of the drawing of the base surface, is obtained by moving the profile AC of the tooth successively to the positions 1, 2, 3 . . . 14, maintaining the point A on the line AB.

In Figure 1 it will be observed that the initial backing off angle at A is equal to 17°. At an intermediate point E it is equal to 13°. At the last grinding point F it is equal to 11° and at the end B of the tooth it is equal to 8°, 30'. These particulars indicate clearly that the variation in the backing off angle is kept considerably above the minimum permissible value of about 6°. This shows that, contrary to the usually accepted view, it is not necessary to maintain a constant backing off angle in order to obtain a good operation.

Moreover, it has been found that a constant backing off angle possesses disadvantages.

On account of the fact that the constant backing off angle is small there is considerable wear on the back and on the sides, while on the other hand, if the constant backing off angle is large, vibrations occur.

The backing off angle according to the present invention which decreases with successive grindings in addition to reducing wear to a reasonable value, has also the advantage of adding material to the back of the tooth and thereby making the tooth stronger.

An essential condition for a high efficiency of the tool is that the profile should remain strictly constant during successive grindings as it does in fact remain in accordance with the present invention.

Figure 2:
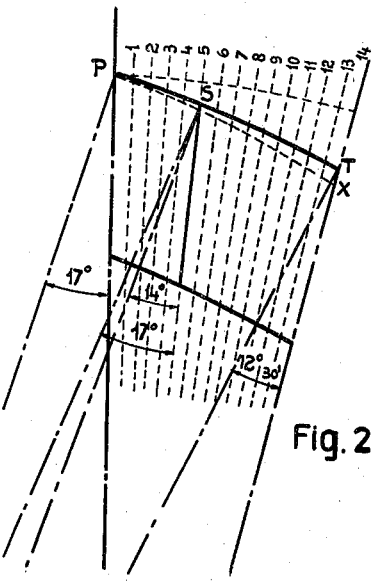
Figure 2 is a similar view to Figure 1 of a cutter tooth backed off with a multiple directrix formed by two circular arcs of finite radii greater than the radius of the tool.

If it is desired to keep the operation of the backing off angle within more strict limits, use may be made of a multiple directrix formed for example as illustrated in Figure 2, of two circular arcs PS and ST. As will be readily understood, the backing off angle at P is 17°; the backing off angle at the commencement of S is equal to 14° and immediately after S is brought back to 17° and the backing off angle at T is equal to 12°, 30'.

The choice of the simple or multiple directrix and of the two initial and final backing off angles will obviously depend upon the fragility or other characteristics of the profits or the hardness of the materials to be worked.

The shape of the directrix and the value of the backing off angles may vary according to technical requirements.

If $Ax$ in Figure 1 and $Px$ in Figure 2 indicate a profile based on an Archimedean spiral it will be seen that the profile according to the invention has a greater mass represented by the area $ABX$ in Figure 1 and $PSTX$ in Figure 2.

It is obvious that in the particular case in which the rotary cutting tool is a hob, the tooth is obtained by radially moving the generator profile along a base helix and maintaining one point of its plane on a curvilinear directrix, of which the projection on a plane tangential to the helix in the point of intersection of the profile plane with said helix is substantially a predetermined curved line, so as to obtain a constant profile and a variable backing off angle.

According to a modification the generator profile is moved tangentially instead of radially along the base helix.

In making a rotary cutting tool according to the present invention, a cam of special shape is used for the control of the tool carrier of the ordinary backing off lathe.

Figure 3:
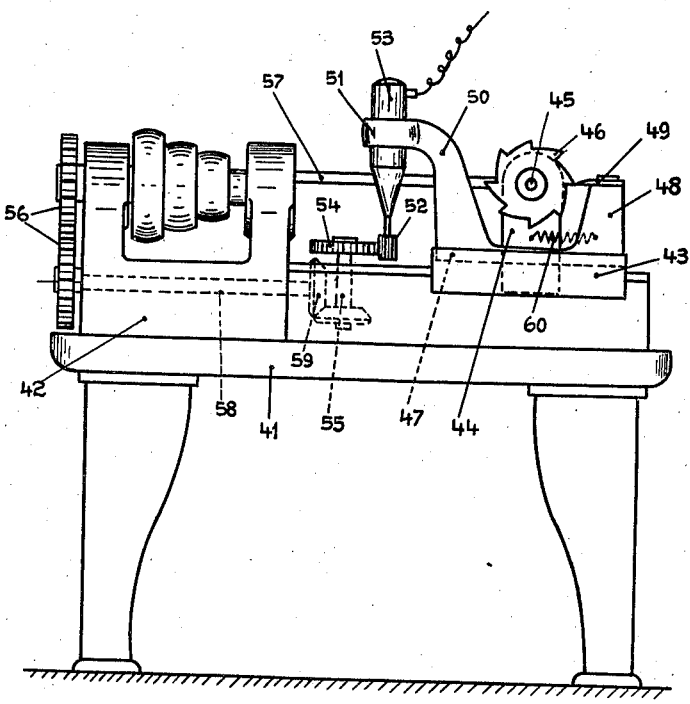
Fig. 3 illustrates diagrammatically a lathe on which the cam for the production of teeth backed off with a curvilinear directrix can be made automatically and with the maximum accuracy.

The cam may be constructed automatically and with the maximum accuracy by the machine illustrated in Fig. 3.

In this figure, 41 is the bed of an ordinary backing-off lathe upon which are mounted the usual poppet head 42 and the slide 43 provided with means, not shown, for regulating the position of the tool with respect to the work carrying mandrel or spindle.

Upon the slide 43 are secured supports 44, upon which is rotatably mounted a transverse shaft 45 carrying the template or reproducing device 46.

Upon the slide 43 is also mounted a carriage 47 which is movable longitudinally and carries at one end a support 48 to which is secured the point 49 co-operating with the template and at the other end a support 50 having at its upper part a jaw 51 to which is secured the tool which, in the example illustrated, is formed by a grinding wheel 52 keyed upon the shaft of an electric motor 53.

The grinding wheel 52 acts upon the work 54 keyed upon a vertical rod or mandrel 55.

The shaft 45 and the mandrel 55 are driven by the shafts 57 and 58 respectively from the group of gears of the lathe (represented in the example illustrated by a single pair of toothed wheels 56 for simplicity).

The ratio of the gearing should be such that the work 54 makes a complete turn for each displacement of the template 46 through one tooth.

A spring 60 secured to the supports 44 and 48 tends to pull the carriage 47 away from the work-spindle while holding the template 46 in contact with the point 49.

The operation is as follows:—

When the lathe has been started, the shaft 45 rotates and the template 46 rotates with it so that the point 49 runs over the back of each tooth of the template, thus causing the slide 47 to move gradually towards the right for a distance corresponding to the directrix in the form of an arc of a circle as above indicated.

When the point 49 reaches the extreme point of a tooth of the template, the work 54 has made a complete turn. The return motion is then effected in order to bring the grind stone back into its original position.

This return is produced by the spring 60 as soon as the point 49 has left the point of a tooth and falls on the back of the next tooth.

The grind stone then effects a new working stroke.

For the manufacture of the cam the reproducing device or template will be given a diameter equal to that of the milling cutter to be constructed; assuming for example that this diameter is equal to 100 m/m., the reproducing device will generate upon the cam a profile such as to back-off the back of the tooth with a directrix in the form of an arc of a circle if the milling cutter has a diameter equal to 100 m/m. or at another point of the tooth or outside the tooth according as the diameter of the milling cutter is greater or less than that of the reproducing device.

If it is desired to construct a frontal cam the profile will be formed upon the front face of the said piece of work. In this case the rod 55 will be dismounted and the piece of work will be keyed to the end of the shaft 58 in place of the bevel wheel 59, which transmits movement to the rod 55.

What I claim is:

1. A rotary cutting tool, having teeth of which homologous points of successive sections, radial of the operating axis of the tool, lie on arcs of conchoids, said conchoids having as their directrix a predetermined curved line having its center spaced from the axis of rotation of the tool, said conchoids being generated by combined rotary movement of the profile of generation about the operating axis of rotation of the tool and radial translation so that a predetermined point in the plane of the profile follows along said curved directrix, said teeth having strictly constant successive radial profiles and variable clearance angles.

2. A rotary cutting tool, having teeth of which homologous points of successive sections, radial of the operating axis of the tool, lie on arcs of conchoids, said conchoids having as their directrix a predetermined curved line lying in a plane perpendicular to the operating axis of the tool, said conchoids being generated by combined rotary movement of the profile of generation about the operating axis of rotation of the tool and radial translation so that a predetermined point in the plane of the profile follows along said curved directrix, said teeth having strictly constant successive radial profiles and variable clearance angles.

3. A rotary cutting tool, having teeth of which homologous points of successive sections, radial of the operating axis of the tool, lies on arcs of conchoids, said conchoids having as their directrix a predetermined arc of a circle of finite radius lying in a plane perpendicular to the operating axis of the tool, said conchoids being generated by combined rotary movement of the profile of generation about the operating axis of rotation of the tool and radial translation so that a predetermined point in the plane of the profile follows along said curved directrix, said teeth having strictly constant successive radial profiles and variable clearance angles.

4. A rotary cutting tool, having teeth of which homologous points of successive sections, radial of the operating axis of the tool, lie on arcs of conchoids, said conchoids having as their directrix a predetermined arc of a circle of finite radius lying in a plane normal to the operating axis of the tool and passing through the apex of the profile of generation, said conchoids being generated by combined rotary movement of the profile of generation about the operating axis of rotation of the tool and radial translation so that a predetermined point in the plane of the profile follows along said curved directrix, said teeth having strictly constant successive radial profiles and variable clearance angles.

5. A rotary cutting tool, having teeth of which homologous points of successive sections, radial of the operating axis of the tool, lie on arcs of conchoids, said conchoids having as their directrices a predetermined polycentric curved line, said conchoids being generated by combined rotary movement of the profile of generation about the operating axis of rotation of the tool and radial translation so that a predetermined point in the plane of the profile follows along said polycentric curved directrix line, said teeth having strictly constant successive radial profiles and variable clearance angles.

6. A rotary cutting tool, having teeth of which homologous points of successive sections, radial of the operating axis of the tool, lie on arcs of conchoids, said conchoids having as their directrices a plurality of consecutive arcs of circles of finite radii, said conchoids being generated by combined rotary movement of the profile of generation about the operating axis of rotation of the tool and radial translation so that a predetermined point in the plane of the profile follows along said directrices, said teeth having strictly constant successive radial profiles and variable clearance angles.

7. A rotary cutting tool having a tooth the back of which has a shape conforming with the surface generated by moving a generator profile with a combined movement of rotation about the axis of rotation of the tool and translation in a radial direction relative to said axis, the plane of the profile being maintained radial with respect to said axis, and a point on said plane following a plurality of curved directrix lines having their centers spaced from the axis of the tool, whereby the tooth has a strictly constant profile upon successive resharpenings radially of the axis of rotation, and a backing-off angle which decreases throughout the portion of the tooth generated with reference to any of said directrix lines but increases at a point on the tooth corresponding with the meeting of one directrix line with a succeeding directrix line and thereafter again decreases rearwardly.

MARIO CHALLIER.